(12) United States Patent
Ortiz Obando

(10) Patent No.: US 10,540,727 B2
(45) Date of Patent: Jan. 21, 2020

(54) METHOD FOR HARMONISING COLOUR IN MANUFACTURED ITEMS

(71) Applicant: COLOR HARMONY EXPERTS, S.C., Guadalupe, Nuevo Leon (MX)

(72) Inventor: Eloisa Maria Ortiz Obando, Nuevo Leon (MX)

(73) Assignee: COLOR HARMONY EXPERTS, S.C., Nuevo León (MX)

( * ) Notice: Subject to any disclaimer, the term of this patent is extended or adjusted under 35 U.S.C. 154(b) by 0 days.

(21) Appl. No.: 15/557,818

(22) PCT Filed: Mar. 13, 2015

(86) PCT No.: PCT/MX2015/000043
§ 371 (c)(1),
(2) Date: Sep. 13, 2017

(87) PCT Pub. No.: WO2016/148557
PCT Pub. Date: Sep. 22, 2016

(65) Prior Publication Data
US 2018/0293673 A1     Oct. 11, 2018

(51) Int. Cl.
*G06Q 50/04* (2012.01)
*G06Q 10/06* (2012.01)
*G06Q 10/08* (2012.01)

(52) U.S. Cl.
CPC ....... *G06Q 50/04* (2013.01); *G06Q 10/06315* (2013.01); *G06Q 10/087* (2013.01)

(58) Field of Classification Search
None
See application file for complete search history.

(56) References Cited

U.S. PATENT DOCUMENTS

| | | | |
|---|---|---|---|
| 2012/0254141 A1* | 10/2012 | Poland | B05D 5/06 707/705 |
| 2015/0109443 A1* | 4/2015 | Nichols | G06T 7/001 348/148 |

* cited by examiner

*Primary Examiner* — Ryan A Jarrett
(74) *Attorney, Agent, or Firm* — Patshegen IP LLC; Moshe Pinchas

(57) ABSTRACT

The invention relates to a method for the harmonization of color in manufactured items, which allows color tolerances to be established based on pre-defined values and visual observations for the different parts that form the item and the operating conditions for the manufacture of said parts by which means the colors falling within said tolerances can be obtained as well as the acceptance of the color harmonization of the final product by means of the use of algorithms and visual examination by a person or a machine.

2 Claims, 6 Drawing Sheets

FIGURE 4

METHOD FOR HARMONISING COLOUR IN MANUFACTURED ITEMS

BACKGROUND OF THE INVENTION

A. Field of the Invention

This invention relates to methods for achieving color harmonization among parts that form manufactured products, such as automobiles and more particularly, with a method for color harmonization of manufactured articles which manages to establish numerical-visual color tolerances for the different parts that make up the article and that ensure the visual approval of the end customer, operating conditions for the manufacture of said parts through which colors are obtained that fall within said tolerances, and the acceptance of the finished product's color harmonization by using algorithms and visual examination by a person or machine.

B. Description of the Related Art

In the last few decades, a noticeable trend has been observed on behalf of the consumer to make the decision to buy a product based on what he/she perceives from his/her five senses, thus controlling and monitoring the final appearance of products in the market, specially with regards to the color of products, has become significantly important; hence why the manufacturing industry has been forced to produce a greater variety of its products in less time, reducing the product life cycle.

Currently, in industries where color approval by the final assembler is required, it is important to have a system that manages the color processes in order to perform them quickly and efficiently.

Among the existing technologies currently used as tools to monitor a part's color are the spectrophotometer, colorimeter and gonio-spectrophotometer, which have the capacity to measure color at a particular point of the production process, comparing it with a given color standard, but these devices have two inconvenients: first and foremost, they give disparate measurements for a visual examination due to not taking into consideration and controlling texture variations and base substrate; unlike this invention, which can indicate the points modified in order to manage color in a manufacturing process and obtain the desired color.

In said manufacturing processes, new customer orders for different products, pieces or parts are continually generated, which are requested in a certain color as final appearance and for said purpose, the orders can be accompanied by a physical part called "master", which is a plate of various substrates or controlled pattern, with the visual appearance desired by the client. Otherwise, the client may provide a numerical or nominative specification referring to industry standard and established patterns, such as the Pantone, but ultimately, it is about obtaining a visual validation of what the client wants.

Once the order is issued, the common practice is to generate a new part number for each different part to be manufactured. For each part, one or more colors can be requested and each color may or may not generate a different part number according to the common practices of the various industries.

For instance, the normal practice currently followed by automobile assemblers to obtain the acceptance of a color specification for an automobile is by means of several color tests, the optimization of manufacturing processes for each part based on staff experience, trial and error, and an exhausting interdepartmental organizational effort. As a result of these empirical processes, labor and machinery costs due to multiple tuning up operations, delays on delivery times, non-programmed costs and unsatisfied customers—who can even detect parts in the same automobile whose colors do not properly match up—, are generated.

In order to partly resolve the aforementioned issues, Poland's patent application publication No. 2012/0254141 describes a computerized system and method to analyze the color consistency in automobile parts and provide feedback on the painting processes produced at an assembly plant. The system and method facilitates the gathering of data and analysis of numerous points during the assembly and painting processes in order to identify possible adjustments so that the parts are painted with a specific tolerance, and it identifies which parts should be assembled with what others so as to ensure color harmony. During an inspection process, the body and bumper are measured, and the measurements and colorimetric data are stored together with an identifier for the part of the body or bumper. Measurements related with the equipment and paint mixture variables are also stored, as well as environmental variables that influence the results of the paint. A software application facilitates data analysis and the availability of troubleshooting manuals, which aid in issue resolution of color discrepancies is mentioned, describing some of them. Since color tendencies drift apart from a concrete standard, changes are made to the painting process, including operation conditions, before painting the parts so as to prevent color inconsistencies.

The Poland method and system adjusts the painting and manufacturing parameters when these fall out of those predefined, but it is well-known in the industry that although the color parameters fall out of those predefined, said color parameters may be accepted by the customer, since upon visually examining the part, it may seem adequate to the eyes of an expert, hence with the Poland method and system, parts accepted after a visual examination by the client may be rejected by the system since they fall out of the predefined parameters, given that the Poland system and method does not take into account the visual examination of the parts. Likewise, the Poland method does not define the iterative generation of any type of tolerances or of the final part, nor of process conditions.

It would be desirable to have a method which takes into account visual examinations of color and that could adjust parts' color and manufacturing parameters in accordance with parts accepted after performing a visual examination and even when these are outside the original color parameters.

In view of the above described need, the applicant developed a method for color harmonization in manufactured articles, which allows establishing color tolerances based on an initial visual pattern and on visual observations for the various parts which make up the article and the operating conditions for manufacture of said parts, all by means of the use of algorithms and visual examination by an individual or machine, through which colors are obtained that ensure client's visual acceptance with regards to an initial pattern and acceptance of the finished product's color harmonization, connecting the various suppliers and giving visibility over the adjustment relative to the visual-numerical tolerances that have been already previously obtained thanks to a visual entry.

The applicant's method allows having total control, detecting and managing the color variations by the client and supplier, in addition to improving the definition of color tolerance. Moreover, the method allows indicating and controlling the process variables based on said variations in the color tolerances.

SUMMARY OF THE INVENTION

It is therefore a main objective of this invention to provide a method for color harmonization in manufactured articles which allows establishing color tolerances based on pre-defined values and visual observations for the various parts that make up the article and the operating conditions of manufacture for said parts through which it is possible to obtain colors that fall within said tolerances and the acceptance of the finished product's color harmonization by means of the use of algorithms and visual examination from a person or machine.

Another main objective of this invention is to provide a method for color harmonization in manufactured articles of the above described nature, which allows having total control, detecting and managing the color variations detected by the client and supplier, in addition to improving the definition of the color tolerance.

Furthermore, the method allows indicating and controlling the process variables based on said variations in the color tolerances.

These and other objectives and advantages of this invention will become apparent to those with routine knowledge of the industry from the following detailed description of the invention.

BRIEF DESCRIPTION OF THE DRAWINGS

FIG. 4 shows an example of a format for a color measurement report of a part-color number.

DETAILED DESCRIPTION OF THE INVENTION

Figure 1:
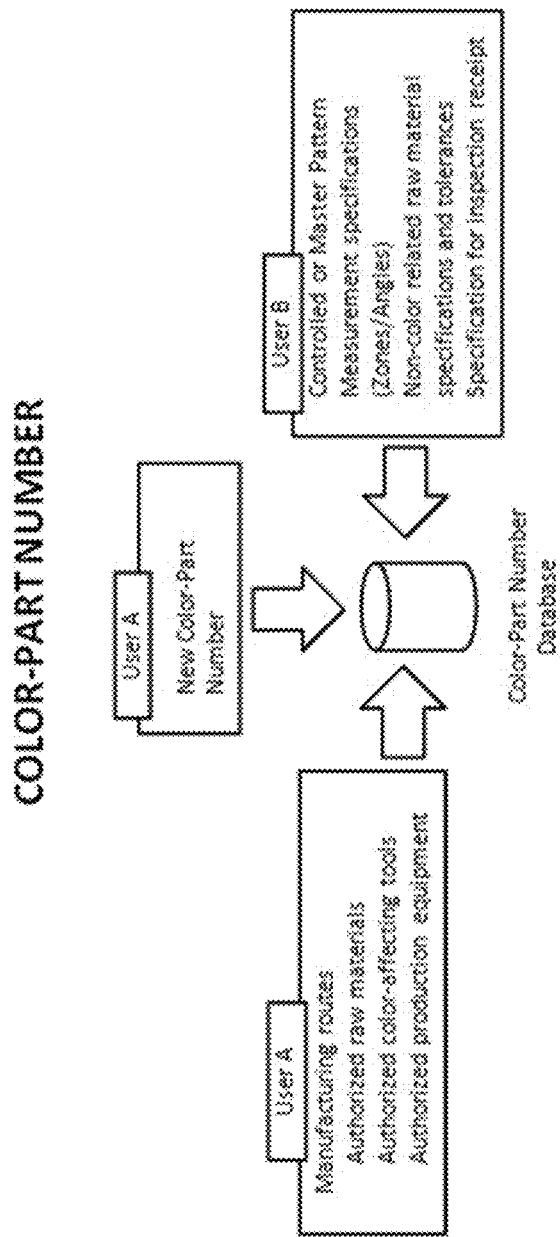
FIG. 1 shows a diagram of an embodiment of elements of information that form the part-color number's registry.

The method for color harmonization in manufactured articles of this invention will now be described by referencing the preferred embodiments of the invention.

In a preferred embodiment, the method of this invention is applied together with a manufacturing system of vehicles with a finishing color, which may have different presentations, such as a parts injection process, which generates products where the resin already has a color and therefore, the parts produced are obtained with a final color or a process for painting parts, in which the parts are already formed by various substrates such as metal or plastic, and a layer of paint is applied giving the part's final color and appearance, among others.

In the context of this description, part refers to a plurality of similar pieces produced according to a model or "part".

In said vehicle manufacturing processes, new customer orders for different products or parts are continually generated, which are requested with a particular color as final appearance and for said effect, the orders may be accompanied by a physical piece called a "master", which is a plate of various substrates or controlled pattern with the visual appearance desired by the client. Otherwise, the client may provide a numerical or nominative specification, referring to industry standard and established patterns, such as the Pantone, but ultimately, it is about obtaining a visual validation of what the client wants.

Once the order has been generated, the common practice is to generate a new part number for each different part that has to be manufactured. For each part, one or more finishing colors can be requested, and each color may or may not generate—in the common practices of the various industries—a different part number.

The method of this invention comprises two main stages: the generation of tolerances and the color harmonization of parts.

The first stage of tolerance generation comprises:

1a) generating a "color-part number" for each vehicle's part to be manufactured.

The color-part number is a unique and distinctive alphanumeric identification not just of the part given its geometry and performance specifications, but also due to the finishing color, meaning that although it is the same part and color is the only change, said identification shall consider them as different elements that will be analyzed independently.

1b) registering the part-color number for each part in a database.

1c) determining the color-affecting production elements (processing and manufacturing equipment, and tools) for the color-part number.

this stage consists in identifying those manufacturing elements whose change may imply considerable changes to the color end result of the manufacturing process and that must be taken into consideration for its control. For instance, these production elements may include the injection mold for the injection processes, the extrusion die and the roller for the extrusion processes, etc.

Figure 2:
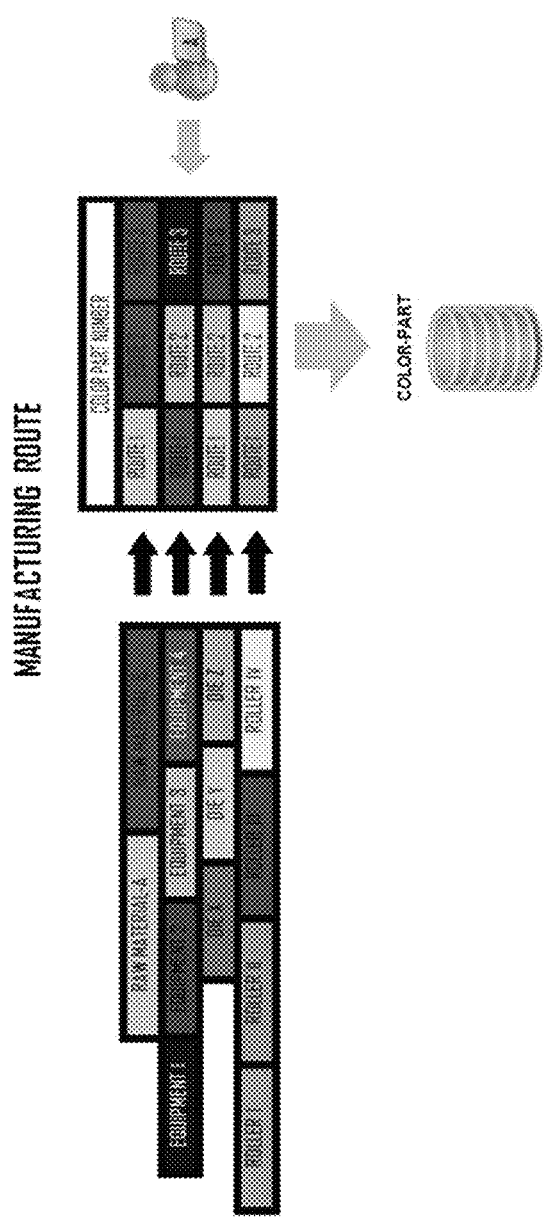
FIG. 2 shows a diagram of an embodiment for an approved manufacturing route.

1d) generating the approved manufacturing route.

this stage consists in defining the sequence or combination of color-affecting process and manufacturing equipment, and tools for the part, and that will be used for manufacturing the various parts. Due to the nature of the manufacturing processes, the most common thing is for there to be different equipment for part manufacturing according to the volumes as well as the number of different products required by the clients. Thus, a manufacturing plant can have—using an extrusion process as example—four or five pieces of extrusion equipment, as well as four dies with the same geometric characteristics and three rollers with the same specification. In accordance with the foregoing, an approved manufacturing route for a color-part number could be: for instance, for extrusion equipment "X", the use of extrusion die "X" with roller "X" (without the "X" references referring to parts indicated in some figure) is authorized. FIG. 2 shows a diagram for the embodiment of an approved manufacturing route.

1e) specifying the critical variables for the process and manufacturing equipment and tools that are part of the approved manufacturing route.

this stage consists in specifying the critical variables for the process and manufacturing equipment and tools, such as, the production and operation conditions of the production equipment, whose variation has an impact on the final color obtained that will be approved by the client. For instance, said variables may include the pressure exerted by roller "X", temperature, etc.

1f) specifying the raw material used in the approved manufacturing route for the manufacturing of each color-part number and its origin, and adding said information to the approved manufacturing route.

This stage consists in adding additional information regarding the origin of the various raw materials used for manufacturing each color-part number, where origin refers to knowing which supplier (or group of suppliers, in the case of parts manufactured with a combination of two or more raw materials) will be who provides the raw material in that "manufacturing route". A change of supplier, even when the rest of the conditions are kept the same, means the creation of a different manufacturing route. Thus, the so-called approved manufacturing routes consist of the specific manufacturing equipment, the set of color-affecting tools, as well as the raw material used.

1g) indicating the controlled pattern or color "master" as well as the color measurement specifications for each color-part number.

Figure 4:
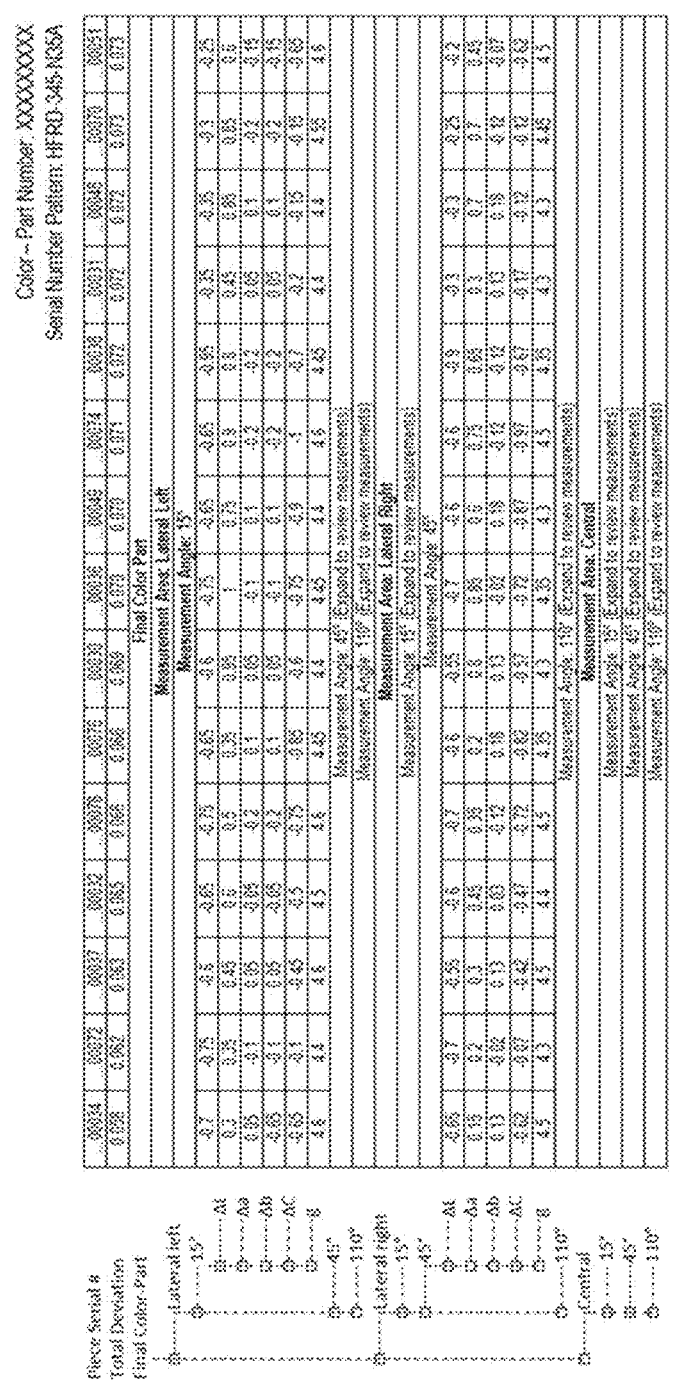

This stage consists in specifying the plate or nominative reference based on a controlled catalog of the visual appearance of color desired by the client on the product, as well as the client's measurement specifications, specifically the zones of the part that require measurement (also called "areas of measurement") and the measurement angles in each of these zones (e.g., in a front fascia, it is usually required for the color to be measured in the front part compared with the automobile's hood, and on the sides compared with its mudguards, and for each zone, verification is required at 15°, 45° and 110°). FIG. 4 shows an example of a color measurement report format for a color-part number.

1h) indicating the specification or tolerances for aspects of the raw materials in non-color related aspects.

This stage includes indicating tolerances for aspects of raw materials, e.g., for the paint: ranges of viscosity, covering power, etc.

1i) for each part produced, determining the production history or "part's DNA"

For each part produced, this stage comprises determining all the elements that converged in that specific part's manufacture. In this "DNA", it is identified which raw material was applied to the part, from what lot and container the former comes from; it is identified which staff was responsible for the transfer, supervision and operation, as well as what was the value of the various process conditions in the approved manufacturing route for the specific part, and the times at which each part was at each of the specific stages of the approved manufacturing route.

There are two viable alternatives for obtaining the parts' "DNA"; by generating an identification number either prior to or after the manufacturing process.

Systematically, the most direct approach comprises generating the identification number prior to the manufacturing process so that as it takes place, the operating conditions, as well as the raw material applied at that moment, is registered into the corresponding part's "DNA".

Figure 3:
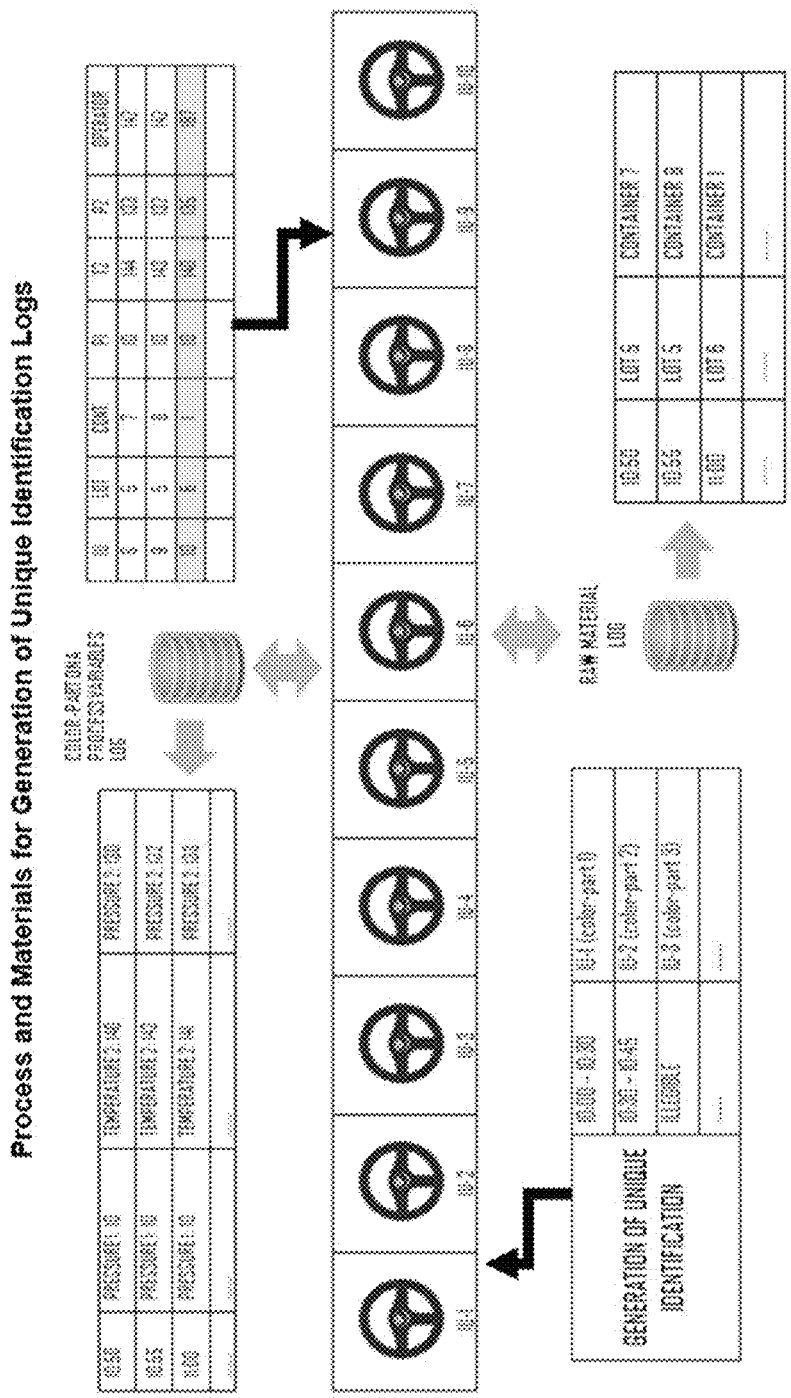
FIG. 3 shows an embodiment for the "Process Variable Log" and "Raw Material Log".

The second alternative is more in accordance with the reality of manufacturing processes, given that a serial number cannot be assigned to a part that has not yet been injected. Similarly, assigning a part number to a piece that is going to be completely painted is complex, given the difficulty of identification following the color coating application. For the implementation of this functionality, the so-called "Process Variables Log" and "Raw Material Log" records have been implemented. An example of said logs is shown in FIG. 3. In said logs, the operating conditions at each moment of the approved manufacturing route are continually registered, such that if the temperature in an oven is 95° C. at 10:05:13 am, said value is recorded in the "Process Variables Log" and this is done with a predetermined frequency at the moment of registering the various manufacturing equipment at the plant. Similarly, a control of raw material is kept so as to manage traceability and integration of the produced part's "DNA". This process is described in point 1j). For instance, it is identified that at 04:32:53 pm, the application of primer from container 22, Lot 17 with raw material part number XYA134 was started. At each moment that a change of application from a different container, lot or raw material in any of the processes is generated, this change is recorded in the "Raw Material Log".

Once both records are on the Log, when generating the identification number for the part subsequent to the manufacturing process, the times when each part was at each stage of the approved manufacturing route at the moment of manufacturing are identified (for instance, in the case of two-layer painting, there is the primer application process, drying process, gloss application process and drying process) and a conjugation of the discussed Logs is done so as to obtain the parts's DNA.

In addition to the aforementioned raw material and process information, as an element of the parts' DNA, information regarding the color is also included, which de facto and due to requiring the examination of the final manufactured part, is assigned once the part has been assigned its unique identification number. This color information consists on: a numerical examination performed using technological equipment, such as an spectrophotometer or other, which under equal conditions of texture, substrate and others gives repeatable numerical readings in a standardized measurement system such as CIELAB, which consists of light/dark (L), red/green (a) and yellow/blue (b) readings, or CIELCH, which consists in light/dark (L), chromaticity (C) and tone (h); as well as, on a visual examination, which is performed by a previously determined capable person or machine, and which assigns values in the same standardized measurement system, but this is done taking into account the controlled pattern or "master" that the user B indicated for this specific color-part, giving values relative to −3, −2, −1, 0, 1, 2, 3, depending on the sense of the deviation. This preferred embodiment defines the −3 value as a variation outside visual comparative tolerance with regards to the controlled pattern in one of the axis, in the negative sense (dark for L, green for a, blue for b); −2 as an acceptable maximum variation; −1 as a slight variation and 0 as an exact adjustment; the negative values giving the same level of variation but in the opposite sense of the axis (light for L, red for a, yellow for b), thus an examination outside of tolerance means that the part is rejected.

FIG. 1 shows a diagram of an embodiment for information elements that form the registry for the part-color number.

1j) adding registry information on the lot and container of the raw material used or applied in the manufacturing process of the part's color to its DNA, thus implementing a traceability method which registers as of entry of the raw material into the warehouse up to its entry into the manufacturing equipment, according to the approved manufacturing route, with the added purpose of implementing a process of First-In, First-Out (FIFO) process, where the traceability method comprises the following stages of:

1ja) upon reception, validating that the raw material corresponds to the supplier previously registered for an approved manufacturing route of the part-color numbers that use said raw material. In case the supplier does not correspond with that previously registered, said raw material will not be allowed into the warehouse and a new "manufacturing route" will be generated prior to its entry;

1jb) registering the color information found in the quality documents of the color raw material;

1jc) validating that the color information registered in the previous stage is within tolerances for color raw material variables (variables in a standardized format such as CIELAB or other) generated in a subsequent stage by means of artificial intelligence (AI) algorithms. In case the color information is outside tolerances, the raw material is rejected. The tolerances are a maximum and a minimum. For instance, if the maximum is 3.5 and the minimum is 1.8, and the value received is 2.7, then the color information is accepted. In turn, if it is 3.7; it is rejected. When performing the method of this invention for the first time, there is no tolerance information, hence, in said case, the raw material will never be rejected.

1jd) registering the lot number as well as the container numbers received in that shipment in order to implement a FIFO process that the manufacturing company of each part will follow, where the first raw material to enter is the one processed;

1je) validating that the shipments are complete and that there are no missing items or errors;

1jf) receive the daily production orders for each part to manufacture, which indicate the requirements of materials;

1jg) locating the required material for the manufacturing process of the parts indicated in the production orders and sending them to the production site, forcing the use of a FIFO process, ensuring that the oldest materials leave the warehouse from a container level and not just lot level. Likewise, the use of the authorized manufacturing routes is obliged, since even if the production order indicates the use of a combination of color-affecting equipment and tools, it will only be permitted to send the material to the previously authorized manufacturing routes and for which process and raw material tolerances have already been defined;

1jh) validating that the raw material is in the authorized and correct manufacturing route;

1ji) introducing the raw material into the production equipment of the authorized manufacturing route;

1jj) registering the entry of raw material into the first piece or group of manufacturing equipment, whose information will be used for generating the Raw Material Log discussed, and subsequently added to the "DNA" of the parts produced, registering the lot and container for the raw material used or applied in the production or manufacturing process of the part's color.

1k) determining numerical-visual color tolerances for each part.

In this stage, by means of AI algorithms with an iterative learning process, and based on the numerical and visual color examinations of the parts produced, visual-numerical tolerances are determined, which owe their name to being numerical given that they can be entered into technological equipment such as the spectrophotometer and ensure obtaining visual measurements within −2 and +2 by the client when compared to the controlled pattern or "master", i.e., they ensure visual acceptance (in the case of this preferred embodiment, in which −3 and +3 were established in 1i) as a visual measurement scale). Furthermore, numerical tolerances are determined, which must be specified to the suppliers of raw materials, ensuring that applied to the approved manufacturing route give as a result the final visual authorization for the parts produced with a color within the visual-numerical tolerances.

1l) obtaining the tolerances for the critical process variables defined in 1e) of the approved manufacturing route and the correlations between the process conditions and the final color result using AI algorithms with an iterative learning process, such as to identify which color variables (variables in a standardized format such as CIELAB or other) in each color-part number are controllable by means of changes to the process conditions, so that the necessary corrective actions can be taken when finding deviations in the color readings of the final parts.

1m) of the parts produced in accordance with the numerical-visual tolerances obtained in stage 1k) and the tolerances for the critical process variables obtained in stage 1l), identifying those parts which best resemble the controlled pattern or master, as well as those close to the theoretical limit of the client's visual acceptance using numerical-visual translation derived from the algorithms described in 1j). (See FIG. 5).

1n) visually examining the parts identified in the precious stage under the criteria of the client who will accept the parts —which is an ideal color specification in accordance with a controlled physical pattern that indicates the color that must be perceived in order to obtain approval and which is obtained by means of the visual comparison performed by an expert or other means—, and a numerical evaluation of color deviation (which are translated into the same −3 to 3 scale) or rather the rejection of the part's color, where the visual examination can be done by the human eye or means of artificial visual examination, such as computer vision systems;

1o) adjusting the numerical-visual color tolerances for a particular part-color number in accordance with the color values obtained from the parts approved in stage 1n) by means of the AI algorithms with an iterative learning process, thereby adjusting the numerical-visual tolerances, considering the visual criteria of the client who will accept the parts;

1p) adjusting the tolerances of the approved manufacturing route and the correlations between the process conditions and the color end result in accordance with the color values obtained from the parts approved in stage 1n) and in addition, accordingly adjust the numerical color tolerances that must be specified to the suppliers of raw material ensuring that applied to the approved manufacturing route result in the supplier's final authorization of the parts.

If for any reason, any raw material specification is changed, such as its supplier—even when the new supplier ensures the same conditions as the former product—, a new manufacturing route will be generated, causing manufacturing to be blocked until a history is created which allows generating the information that allows indicating the tolerances for the different variables that ensure client's final visual approval.

This stage also includes monitoring the process conditions of the approved manufacturing routes and generating alarms whenever any of the process conditions fall outside the tolerance defined by the AI algorithms previously described, in order to take corrective actions to rectify the deviation, such as reducing the temperature of a process.

When production chooses to change any color-affecting equipment or tool, the method comprises blocking said change given that a new manufacturing route will be created which has not been authorized or rather, the creation of the history from zero will be required, allowing the creation of new process, color and raw material tolerances that ensure the part's final color.

To exemplify this situation, if a color-part number is being produced in equipment "X" with extrusion die "X" and roller "X", the system will return, resulting from the analysis of previous information, the process tolerances and other variables that ensure obtaining the final color that the client will approve. If roller "X" is changed for roller "Y", the tolerances have to be reevaluated in order to be certain of the client's final approval, given that said change implies potential changes to the various production conditions. The same applies if the same set of color-affecting tools are maintained, i.e., the extrusion die "X" and roller "X", but there is a change in equipment to extrusion equipment "Y". In said case, a new manufacturing route will be created, reason why the change must be blocked or notified so that prior to production, the history is created that allows defining new tolerances for the process variables that ensure the client's visual approval.

Figure 5:
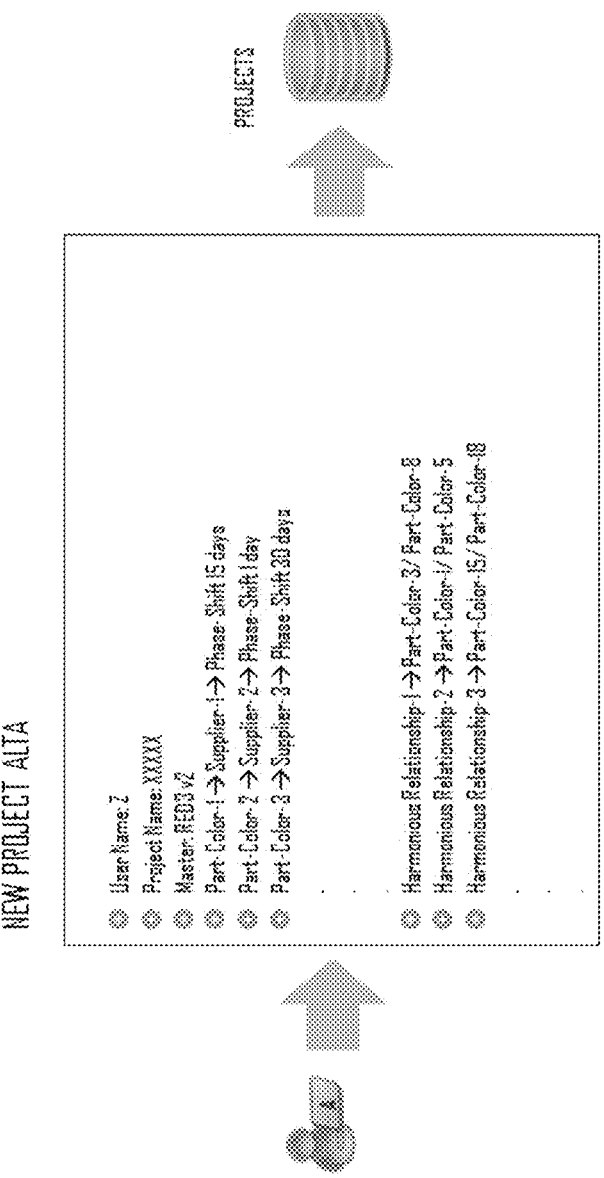
FIG. 5 shows an example of a report format where a project embodiment is shown.

The second stage comprises the color harmonization of parts and its objective is to achieve harmonization of the different parts from the suppliers that are integrated into a finished product, whether a vehicle, an electrical household appliance or others. For this type of integrated finished products, there is the complexity that even if the correct parameters were ideally defined for each one of the parts so as to be visually observed as having no significant variation with regards to an initially controlled pattern; if a part is within a visual evaluation value of −2 (e.g., maximum green) and an adjacent part is within a visual examination value of +2 (e.g., maximum red), when integrating them in a vehicle, if they are physically adjacent, a significant relative difference will be observed, which although was acceptable with regards to the master, when coming together in a vehicle create disparity and visual discrepancy, which is not acceptable by the client. The part's color harmonization stage comprises the following steps of:

2a) for each product to be assembled, whose parts require to be observed in visual harmony, registering assembly project or "project" information, including but not limited to the following information: project code, information of the article to be assembled—including but not limited to article number, article description—, information on each part it is made up of—including but not limited to color-part number, color of the color-part number, part description—and color of the assembled product. All suppliers who have parts or supplies that make up the product and require being in visual harmony with each other will "subscribe" to this project. FIG. 5 shows an example of a report format which shows a project embodiment.

Figure 6:
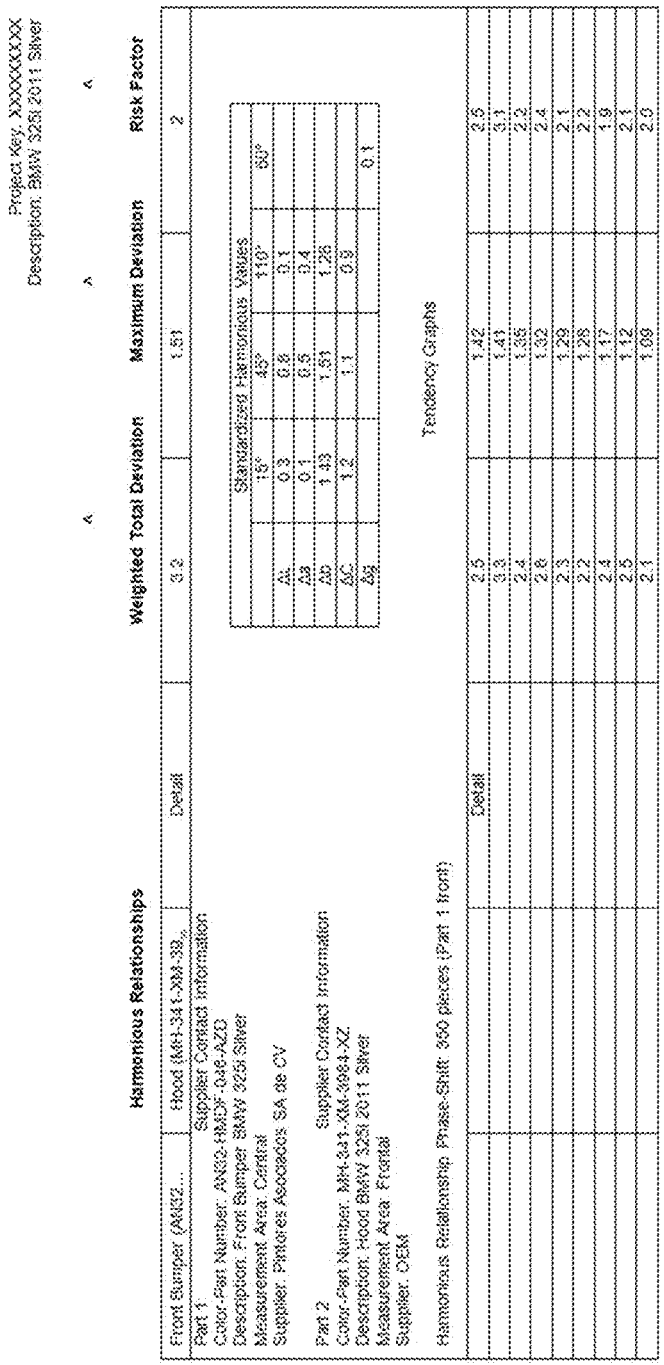
FIG. 6 shows an example of a report format where the characteristics of a harmonious relationship are shown.

2b) generating "harmonious relationships", which includes generating information that defines the interrelationship of two or more color-part numbers, which due to the need for the client's final acceptance, must be in visual harmony with each other, a situation usually related with the physical closeness or proximity in the assembled and finished product. When generating these harmonious relationships, it is determined which color-part number is related to which other, which measurement area of each color-part number must relate with which measurement area of the rest of the parts that make up the harmonious relationship, and finally which supplier provides each part. FIG. 6 shows an example of a report format where the characteristics of a harmonious relationship are shown;

2c) registering all the harmonious relationships for each project and registering the information of each supplier (such as name, code and contact information) for each part, establishing the harmonious relationships each supplier participates in;

2d) establishing a numerical phase-shift indicator for each harmonious relationship, whose objective is to identify which parts will be assembled together by the final assembler in accordance with the sequence in which they are received by the manufacturer following a FIFO system, under the understanding that the parts a manufacturer A produces today, can hardly be expected to be assembled together with the parts a manufacturer B produces today, due to different shipping times, inventory levels, etc. This phase-shift indicator is specified for each harmonious relationship and can be obtained in different ways: calculating the number of parts en route and in inventory for each one of the parts that make up the harmonious relationship at the moment of an assembly, and calculating the difference between the two numbers; identifying when production is started and by conservation of mass maintaining the relationship in the future; or rather by determining what parts are being assembled in a particular moment given as calculation and confirmation of the phase-shift indicator. In the case of parts used in various assembly projects, it is indicated to the harmonious relationships which ranges of unique identification numbers are related with a project and which to another, a common practice of the industries where it is involved.

2e) for each part that makes up the harmonious relationship, providing numerical-visual color information that is directly related to the visual resemblance of the parts to the master or controlled pattern, on a predefined scale. The information received will consist of the parts' color data (based on a CIELAB or other format) having been subjected to numerical-visual translation either by the method previously described in 1n) or by another method. This implies that the parts have a numerical value that ensures either proximity or remoteness with regards to a controlled pattern shared by the members of the harmonious relationship and which de facto implies a predetermined scale with numerical acceptance or rejection limits that ensure the visual aspect. In the case of the previously described method, these acceptance limits are between −2 and 2; a value of 3 is no longer visually acceptable.

2f) continuously comparing the numerical-visual color values of the interrelated parts of each harmonious relationship provided in stage 2e) in order to verify the status of each harmonious relationship and with it identify whether there are harmonious relationships close to the unacceptable levels of the predetermined numerical-visual scale through relative comparison and not just with regards to the master or controlled pattern, taking into account the numerical phase-shift indicator as indicator of the order in which the parts that make up a harmonious relationship will be compared, and obtaining a relative deviation between both numerical-visual color values, which also adjusts to the same numerical-visual tolerance scale that in a preferred embodiment is of −2 to 2. The integral relative deviation can be obtained by counting the number of "places" between both values on the −2 to 2 scale, thus, if the numerical-visual value of part A has a value of 1 and that of part B has a value of −1, the relative deviation is 2, so it is within the maximum acceptance limit. In turn, if part A has a numerical-visual value of 1.5 and part B has a value of −1; the relative deviation is 2.5, hence it is outside the relative tolerance. At the same time, if both parts are at 3, the relative deviation is zero, but both parts are far away from the controlled pattern, which is not desirable either. Moreover, the relative deviation can be obtained by means of intelligent algorithms when it is considered that these type of measurements exist for the different variables of the color measurement system used (such as CIELAB or other), and then there are relative deviations in L, a, b or others. By means of intelligent algorithms, a deviation index is generated that considers both, the relative deviation and the joint deviation with regards to the master, and integrates all the color variables (L, a, b, others) in order to identify the general status of the harmonious relationship.

It must ultimately be understood that the color harmonization method in manufactured articles of this invention is not limited to the embodiment previously described and that experts in the field will be trained, by the teachings established herein, to make changes to the color harmonization method in manufactured articles of this invention, whose scope will be established exclusively by the following claims.

The invention claimed is:

1. An automated system for the harmonization of the color of two or more parts that will be integrated into a finished product, comprising:
   a) means for identifying one or more sets of parts whose colors must be in visual harmony with each other;
   b) means for identifying which area of each part of the one or more sets of parts whose colors must be in visual harmony with each other, must be considered as a "measurement area";
   c) means for registering information about the parts that comprise each set of parts whose colors must be in visual harmony with each other and about information of each individual part,
   d) means for registering supplier information for each part of the one or more sets of parts whose colors must be in visual harmony with each other;
   e) means for obtaining a numerical phase-shift indicator for each, part of the one or more sets of parts whose colors must be in visual harmony with each other said numerical phase-shift indicator identifying which parts will be assembled together by a final assembler in the finished product in accordance with a sequence in which they are received by the assembler, following a FIFO system;
   f) means for providing numerical color values that are directly related to the visual resemblance of the parts with a master of controlled pattern, on a predefined scale for each of the parts that integrate the one or more set of parts whose colors must be in visual harmony with each other;
   g) means for continuously comparing the numerical color values of the parts of the one or more set of parts whose colors must be in visual harmony with each other, in order to identify whether there are parts whose numerical color values are close to unacceptable levels on a predetermined numerical-visual scale, said means for continuously comparing the numerical color values, taking into consideration the numerical phase-shift indicator as an indicator of the order in which the parts of a set of parts will be compared.

2. The automated system in accordance with claim 1, wherein the means for obtaining a numerical phase-shift indicator obtains the numerical phase-shift indicator by; calculating the number of parts en route to a warehouse and calculating the number of parts in an inventory for each one of the parts that forms a set of parts whose colors must be in visual harmony with each other at the moment of an assembly and calculating the difference between the number of parts en route to a warehouse and the number of parts in the inventory for each one of the parts that forms a set of parts whose colors must be in visual harmony with each other.

* * * * *